Patented Apr. 7, 1925.

1,532,772

UNITED STATES PATENT OFFICE.

DIRK ROELOF NIJK, OF LEIDEN, NETHERLANDS, ASSIGNOR TO NAAMLOOZE VEN-NOOTSCHAP: NEDERLANDSCHE GIST-EN SPIRITUSFABRIEK, OF DELFT, NETHER-LANDS.

PROCESS FOR PRODUCING NONPEROXIDIZABLE ETHER.

No Drawing. Application filed January 7, 1925. Serial No. 1,087.

*To all whom it may concern:*

Be it known that I, DIRK ROELOF NIJK, a subject of the Queen of the Netherlands, residing at Leiden, the Netherlands, have invented certain new and useful Improvements in Processes for Producing Nonperoxidizable Ether, of which the following is a specification.

My invention relates to the purification of ether by a method which does not give rise to the formation of peroxides.

According to another process also invented by me a chemically pure ether may be obtained by isolating anhydrous ether with benzidine or its homologues or its substitution products in the form of crystals, separating these from the mother liquor and then regenerating the ether from the crystals by heat.

I have now found that from the mother liquor, left after the preparation and separation of the crystals, a durable ether may be prepared in which peroxides are no longer formed, by distilling such mother liquor.

Again when sodium-ether is kept in contact with and/or thoroughly shaken with excess of benzidine and then exposed to the air after a short time the liquid becomes red-tinged by the formation of a dye from the benzidine. By distilling this ether, however, the distillate, on testing from time to time, is found to be free from peroxides.

It would appear that one of the peroxides, i. e. the diethyl-peroxide in ether purified by sodium, is not decomposed by the sodium but becomes so when treated with and distilled in the presence of benzidine or its homologues or its substitution products.

The reagent used for testing was a solution of ammonium sulphocyanide and pure ferrous sulphate, the ether from benzidine giving no red tinging, while the ether which has been treated with sodium does. Even in presence of excess of sodium the ether still continues to oxidize while that from benzidine remains unchanged.

The process of this invention therefore, consists in treating common or preferably purified ether with benzidine or its homologues such as tolidine, etc., or its substitution products such as tetramethylbenzidine, etc., by allowing it to stand in contact with or shaking it with an excess of one or more of the aforesaid substances; in filtering the ether so purified from such excess and in distilling the former. Benzidine and its homologues and substitution products referred to herein, are included in the expression "a benzidine material" employed in the appended claims.

A stable product can be obtained by means of this invention from ether purified in any known manner. Such product may be kept in corked bottles and does not give rise to the formation of peroxides in the air.

The production of an ether, which does not peroxidize, is obviously of great importance for industrial purposes as well as for medical and laboratory use.

Dangerous explosions have often occurred by the presence of peroxides in ether, even with ether purified with sodium. By using the product purified according to this invention however, such explosions would not have taken place.

I claim:

1. The production of non-peroxidizable ether by a process which consists in treating ether with an excess of benzidine, and filtering the ether from said excess.

2. The production of non-peroxidizable ether by a process which consists in treating ether with an excess of a benzidine material and filtering the ether from said excess.

3. The production of non-peroxidizable ether by a process which consists in treating purified ether with an excess of a benzidine material and filtering the ether from said excess.

In testimony whereof I affix my signature.

DIRK ROELOF NIJK.